United States Patent [19]

Wiggins et al.

[11] 4,307,207

[45] Dec. 22, 1981

[54] BLENDS OF HIGH NITRILE RESINS AND HYDROPHOBIC NYLONS

[75] Inventors: Wayne T. Wiggins, Aurora; Gerald P. Coffey, Lyndhurst, both of Ohio

[73] Assignee: Standard Oil Company, Cleveland, Ohio

[21] Appl. No.: 163,127

[22] Filed: Jun. 26, 1980

[51] Int. Cl.$^3$ .................. C08L 77/00; C08L 55/02; C08L 51/04

[52] U.S. Cl. ........................ 525/66; 525/184

[58] Field of Search ........................... 525/66

[56] References Cited

U.S. PATENT DOCUMENTS

| | | | |
|---|---|---|---|
| 3,134,746 | 5/1964 | Grabowski | 525/184 |
| 3,267,175 | 8/1966 | Grabowski | 525/71 |
| 4,000,216 | 12/1976 | Lang | 525/66 |
| 4,079,024 | 5/1978 | Hess | 525/64 |
| 4,221,879 | 9/1980 | Humme | 525/66 |

FOREIGN PATENT DOCUMENTS 50-112954  9/1975  Japan ..................... 525/66

*Primary Examiner*—Paul Lieberman
*Attorney, Agent, or Firm*—William D. Mooney; Herbert D. Knudsen; Larry W. Evans

[57] ABSTRACT

Impact resistant polymeric compositions are composed of a blend of a high nitrile resin and a hydrophobic nylon. The high nitrile resins useful in this invention are those produced by polymerizing a major proportion of a monounsaturated nitrile, e.g. acrylonitrile, and a minor proportion of another monovinyl monomer component, e.g. methyl acrylate, copolymerizable therewith optionally in the presence of a preformed rubber. The hydrophobic nylons useful in this invention comprise nylon-11, nylon-12 anc cyclic nylons.

14 Claims, No Drawings

BLENDS OF HIGH NITRILE RESINS AND HYDROPHOBIC NYLONS

We have now discovered that the processability and impact strength of certain hydrophobic nylon polymers can be improved significantly by blending these polymers with high nitrile resins. The blends of this invention are composed of two polymer components—namely, first a copolymer of a monounsaturated nitrile and another monovinyl monomer component copolymerizable therewith and second a hydrophobic nylon. Both polymer components are thermoplastics.

Thermoplastic high nitrile resins of at least 50% by weight of a monounsaturated nitrile and up to 50% by weight of at least one other comonomer and which may also be rubber modified have previously been described in U.S. Pat. Nos. 3,426,102, 3,586,737, 3,763,278 and elsewhere. These copolymers have excellent barrier properties and can be molded into containers, pipes, films, sheets, and the like, to be used for packaging solids, liquids and gases of various types.

Thermoplastic hydrophobic nylons are also well known. The hydrophobic nylons useful in this invention are nylon-11, nylon-12 and cyclic nylons. Typically, nylon-11 is produced continuously by heating W-aminoundecanoic acid with continuous removal of water. Nylon-12 is normally produced by heating dodecyl lactam in the presence of aqueous phosphoric acid. Cyclic nylons are normally prepared by reacting a dicarboxylic acid with a diamine wherein at least one of the dicarboxylic acid or diamine is a cyclic compound. These hydrophobic nylons and their methods of preparation are described in greater detail in *Organic Polymer Chemistry* by K. J. Saunders, pages 182–192 (Chapman and Hall, 1973).

The cyclic nylons discussed above each contain a monomer which is cyclic. Preferred cyclic nylons are prepared by the polycondensation of:
(a) a diamine of the formula

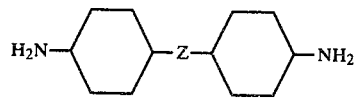

wherein Z is a bond or an alkylene chain of from one to six carbon atoms which may be optionally substituted by one or more methyl groups, and wherein each cyclohexane ring may optionally be substituted by one or more methyl groups;
(b) a dicarboxylic acid or acid chloride of the formula

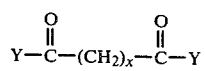

wherein X is 1 to 16 and Y is selected from the group consisting of OH and Cl.
Further polyamide forming components, i.e. aliphatic dicarboxylic acids and aliphatic diamines, can also be added to this polycondensation in order to reduce the crystallinity of the nylon. Examples of these cyclic nylons are shown in British Pat. No. 1,548,431.

Preferred cyclic nylons can also be prepared either by reacting a diamine with a dicarboxylic acid or acid chloride of the formula:

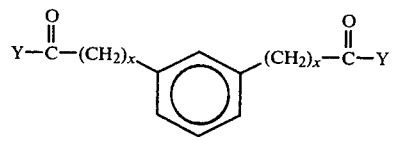

wherein x and Y are defined above, or by reacting a dicarboxylic acid or acid chloride with a diamine of the formula

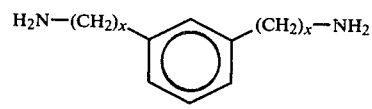

wherein x is defined above.

The high nitrile copolymers useful in this invention are those produced by polymerizing a major proportion of a monounsaturated nitrile, e.g. acrylonitrile, and a minor proportion of another monovinyl monomer component copolymerizable therewith, optionally in the presence of a diene rubber which may be a homopolymer or copolymer of a conjugated diene monomer.

The high nitrile polymeric compositions of the present invention can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen.

The olefinically unsaturated nitriles used in the present invention are the alpha, beta-olefinically unsaturated mononitriles having the structure:

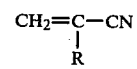

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers, and others.

The esters of olefinically unsaturated carboxylic acids include those having the structure:

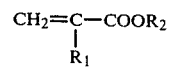

wherein $R_1$ is hydrogen, an alkyl group having from 1 to 30 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

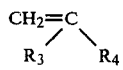

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate.

The vinyl aromatic monomers include styrene, alpha-methyl styrene, the vinyl toluenes, the vinyl xylenes and the like. Most preferred is styrene.

The olefinic nitrile copolymer is optionally in the presence of a preformed diene rubber which may be a homopolymer or copolymer of a conjugated diene monomer. These monomers include butadiene-1,3, isoprene, chloroprene, bromoprene, cyanoprene, 2,3-dimethyl butadiene-1,3, 2-ethyl butadiene-1,3, 2,3-diethyl butadiene-1,3 and the like. Most preferred for the purpose of this invention are butadiene-1,3 and isoprene because of their ready availability and their excellent polymerization properties.

The conjugated diene monomer may be copolymerized with a comonomer selected from the group consisting of vinyl aromatic monomer, an olefinic nitrile monomer having the structure:

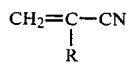

wherein R has the foregoing designation, and an ester having the structure:

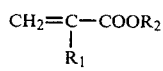

wherein $R_1$ and $R_2$ have the foregoing designations. The rubbery polymer contains from 50% to 100% by weight of polymerized conjugated diene monomer and from 0% to 50% by weight of a comonomer.

Preferred polymers useful in this invention are those prepared by the polymerization of 100 parts by weight of (A) from 60% to 90% by weight of at least one nitrile having the structure:

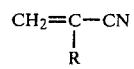

wherein has the foregoing designation, ad (B) from 10% to 40% by weight based on the combined weights of (A) and (B) of at least one member selected from the group consisting of (1) an ester having the structure:

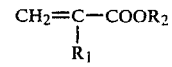

wherein $R_1$ and $R_2$ have the foregoing respective designations, (2) and alpha-olefin having the structure:

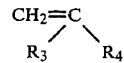

wherein $R_3$ and $R_4$ have the foregoing respective designations, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure:

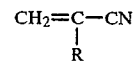

wherein R has the foregoing designation, and an ester having the structure:

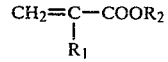

wherein $R_1$ and $R_2$ have the foregoing respective designations, said rubbery polymer containing from 50% to 100% by weight of polymerized conjugated diene and from 0% to 50% by weight of a comonomer.

The most preferred nitrile copolymers are prepared by the polymerization of between 70 and 80 parts by weight of (A) and 20 to 30 parts by weight of (B) in the presence of from 5 to 15 parts by weight of (C).

The hydrophobic nylon and the nitrile copolymer are blended in any conventional manner including melt blending. The instant blend can contain from 1% to 99% by weight nitrile resin. The preferred composition of the blend will depend upon the characteristic desired of the end product, and will normally be in the range of 6% to 20% by weight of a nitrile resin.

The preferred method for blending the nylon and the nitrile resin is melt blending. Melt blending temperatures can range from 100° C. below the melt temperature of the nitrile resin to 100° C. above the melt temperature of the nylon resin. However, the final melt temperature should be very close to or just above the melt temperature of the nylon being blended to ensure satisfactory melting. The melt blending pressures range from atmospheric to 8,000 psi. These pressures vary depending on the nature of the blend, the melt blending apparatus and the concentration of the reactants. In order to achieve proper mixing and processing, the resins must be dry, i.e. less than 0.05% moisture content.

This invention is further illustrated in the following examples wherein the amounts of ingredients are expressed in parts by weight unless otherwise indicated.

COMPARATIVE EXAMPLE A

A graft copolymer was prepared by polymerizing 75 parts of acrylonitrile and 25 parts of methyl acrylate with an acrylonitrile-butadiene rubber as described in Examples 1A and 1B of U.S. Pat. No. 3,426,102. This acrylonitrile copolymer was melt processed in a Brabender extruder and then pelletized. The resulting pellets were then molded into a sheet. The notched izod was determined by a procedure conforming to ASTM D 256. Processing conditions and physical testing results are shown in Table I.

COMPARATIVE EXAMPLE B

Nylon-11 was melt processed in the apparatus shown in Comparative Example A. The physical testing results are shown in Table I.

COMPARATIVE EXAMPLE C

Nylon-12 was melt processed in the apparatus shown in Comparative Example A. The physical testing results are shown in Table I.

COMPARATIVE EXAMPLE D

A cyclic nylon was also melt processed in the apparatus shown in Comparative Example A. This cyclic olefin was prepared by the polycondensation of about 36% of 4,4'-diamino-3,3'-dimethyl dicyclohexylmethane, about 33% of isophthalic acid, and about 33% of aminolauric acid. The physical testing results are shown in Table I.

EXAMPLE 1

Six parts of the acrylonitrile copolymer produced in Comparative Example A and 94 parts of nylon-11 were melt compounded in a Brabender extruder and then pelletized. The resulting blend was then extruded into sheet. The process conditions and the physical testing results are shown in Table I.

EXAMPLE 2 THRU 7

Nylon-11, nylon-12 and the cyclic nylon prepared in Comparative Example D were melt blended with the acrylonitrile copolymer produced in Comparative Example A. The procedure followed was the same as in Comparative Example A and the results are shown in Table I.

TABLE I

| | Blends of High Nitrile Copolymers with Hydrophobic Nylons | | |
|---|---|---|---|
| Example | Polymer | Weight Ratio of Blend | Notched Izod (ft.-lbs./ in. notch) |
| A | Nitrile copolymer | — | 1.40 |
| B | Nylon 11 | — | 1.72 |
| C | Nylon 12 | — | 0.29 |
| D | Cyclic nylon | — | 1.22 |
| 1 | Nitrile copolymer/Nylon 11 | 6/94 | 2.39 |
| 2 | Nitrile copolymer/Nylon 12 | 20/80 | 0.94 |
| 3 | Nitrile copolymer/Nylon 12 | 10/90 | 1.06 |
| 4 | Nitrile copolymer/Nylon 12 | 6/94 | 1.02 |
| 5 | Nitrile copolymer/Cyclic nylon | 20/80 | 3.17 |
| 6 | Nitrile copolymer/Cyclic nylon | 10/90 | 1.60 |
| 7 | Nitrile copolymer/Cyclic nylon | 6/94 | 1.80 |

It is clear from the above data that there is a synergistic interaction between the high nitrile copolymer and the hydrophobic nylons which results in unexpectedly high notched izods.

The polymeric blends of the present invention are thermoplastic materials which can be thermoformed into a wide variety of useful articles in any of the conventional ways employed with known thermoplastic materials, such as by extrusion, milling, molding, drawing, blowing and the like.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. A polymer composition comprising a blend of (i) a polymer produced by polymerizing a major proportion of a monounsaturated nitrile, a minor proportion of another monovinyl monomer copolymerizable therewith optionally in the presence of a diene rubber, and (ii) a polyamide selected from the group consisting of nylon-11, nylon-12 and cyclic nylons wherein said cyclic nylon is prepared by reacting a dicarboxylic acid or acid chloride thereof with a diamine where at least one of said reactants is a cyclic compound, wherein (i) is a high nitrile copolymer prepared by the polymerization of 100 parts by weight of (a) from 60% to 90% by weight of at least one nitrile having the structure:

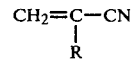

wherein R is hydrogen, a lower alkyl group having from 1 to 4 carbon atoms, or a halogen, and (B) from 10% to 40% by weight based on the combined weights of (A) and (B) of at least one member selected from the group consisting of (1) an ester having the structure:

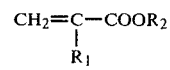

wherein R is hydrogen, an alkyl group having from 1 to 30 carbon atoms, or a halogen, and $R_2$ is an alkyl group having from 1 to 6 carbon atoms, (2) an alpha-olefin having the structure:

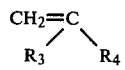

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure:

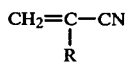

wherein R has the foregoing designation, and an ester having the structure:

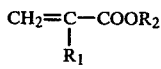

wherein $R_1$ and $R_2$ have the foregoing respective designations, said rubbery polymer containing from 50% to 100% by weight of polymerized conjugated diene and from 0% to 40% by weight of comonomer.

2. The blend of claim 1 wherein (i) contains between 70 and 80 parts by weight of (A).
3. The blend of claim 1 wherein (A) is acrylonitrile.
4. The blend of claim 1 wherein (B) is methyl acrylate.
5. The blend of claim 1 wherein (i) contains from 5 to 15 parts by weight of (C).
6. The blend of claim 1 wherein the blend contains a major proportion of (ii).
7. The blend of claim 5 wherein the blend contains 75% to 95% by weight of (ii).
8. The blend of claim 1 wherein (ii) is nylon-10.
9. The blend of claim 1 wherein (ii) is nylon-11.
10. The blend of claim 1 wherein (ii) is a cyclic nylon.
11. The blend of claim 1 wherein the blend contains a major proportion of (i).
12. The blend of claim 11 wherein the blend contains 75% to 95% of (i).
13. The blend of claim 10 wherein the cyclic nylon is prepared by the polycondensation of:
(a) a diamine of the formula

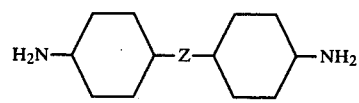

wherein Z is a bond or an alkylene chain of from one to six carbon atoms which may be optionally substituted by one or more methyl groups, and wherein each cyclohexane ring may optionally be substituted by one or more methyl groups;
(b) a dicarboxylic acid or acid chloride of the formula

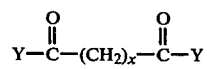

wherein x is 1 to 16 and Y is selected from the group consisting of OH and Cl.
14. The blend of claim 10 wherein the cyclic nylon is prepared either by reacting a diamine with a dicarboxylic acid or acid chloride of the formula:

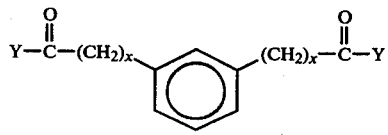

wherein x and Y are defined above, or by reacting a dicarboxylic acid or acid chloride with a diamine of the formula:

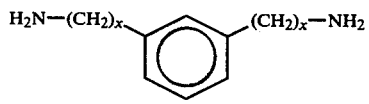

wherein x is 1 to 16.

* * * * *